United States Patent [19]
McPherson et al.

[11] Patent Number: 5,450,907
[45] Date of Patent: Sep. 19, 1995

[54] ROCK COLLECTING IMPLEMENT

[75] Inventors: Mac E. McPherson; Michael G. McPherson, both of Jamestown, N. Dak.; Kenneth L. Innocent, Sacramento, Calif.; Gary A. Parkos; Roger D. Noskas, both of Browerville, Minn.

[73] Assignee: Glenmac Inc., Jamestown, N. Dak.

[21] Appl. No.: 96,164

[22] Filed: Jul. 21, 1993

[51] Int. Cl.⁶ .............................................. A01B 43/00
[52] U.S. Cl. ..................... 171/128; 172/63; 172/43
[58] Field of Search ........... 171/128; 172/63, 65, 172/19, 67, 143, 128

[56] References Cited

U.S. PATENT DOCUMENTS

| | | | |
|---|---|---|---|
| 1,262,563 | 4/1918 | Reilly | 171/19 |
| 1,366,068 | 1/1921 | Doane | |
| 1,497,855 | 6/1924 | Joneson | |
| 2,222,840 | 9/1940 | Holmes | 37/136 |
| 2,787,876 | 4/1957 | Cole | 55/17 |
| 2,938,586 | 5/1960 | Gaffney | 171/63 |
| 2,971,587 | 2/1961 | Anderson | 171/63 |
| 3,117,631 | 1/1964 | Fahrenholz | 171/63 |
| 3,324,955 | 6/1967 | Perold | 172/136 |
| 3,332,222 | 7/1967 | Heinlein | 56/377 |
| 3,465,456 | 9/1969 | Meyer | 37/50 |
| 3,479,755 | 11/1969 | Schropp | 37/8 |
| 3,703,210 | 11/1972 | Williams et al. | 172/784 |
| 4,033,062 | 7/1977 | Denecky | 43/15 |
| 4,040,490 | 8/1977 | Anderson | 171/63 |
| 4,221,265 | 9/1980 | Pratt | 171/126 |
| 4,270,614 | 6/1981 | Judy | 171/63 |
| 4,315,546 | 2/1982 | Fahrenholz | 171/65 |
| 4,440,235 | 4/1984 | Colistro | 171/63 |
| 4,496,003 | 1/1985 | Bynum | 171/63 |
| 4,516,639 | 5/1985 | Hammarlund et al. | 172/99 |
| 4,555,897 | 12/1985 | Degelman | 56/228 |
| 4,609,050 | 9/1986 | Jacobs et al. | 171/65 |
| 4,632,632 | 12/1986 | Simone | 901/17 X |
| 5,024,280 | 6/1991 | Mork | 172/197 |
| 5,060,732 | 10/1991 | Baskett | 171/19 X |
| 5,070,946 | 12/1991 | Herr et al. | 171/65 |

FOREIGN PATENT DOCUMENTS

| | | | |
|---|---|---|---|
| 1048791 | 2/1979 | Canada | |
| 917822 | 2/1963 | United Kingdom | 171/63 |
| 2148083 | 5/1985 | United Kingdom | 171/63 |
| 801767 | 2/1981 | U.S.S.R. | 171/65 |
| 1029844 | 7/1983 | U.S.S.R. | 171/63 |
| 1572434 | 6/1990 | U.S.S.R. | 171/63 |

Primary Examiner—Randolph A. Reese
Assistant Examiner—Christopher J. Novosad
Attorney, Agent, or Firm—Westman, Champlin & Kelly

[57] ABSTRACT

An implement for gathering objectionable rocks and debris from the ground including a positive stop for limiting the range of displacement of the gathering mechanism relative to the ground. In the embodiment described, the gathering mechanism comprises a first roller to engage the ground to dislocate rocks and debris therefrom; and a second roller forming a gap above the first roller through which only selected rocks and debris may pass. The height of the first and second rollers in reference to the ground is vertically adjustable. The first and second roller are displaced upward by large forces placed upon the first roller.

13 Claims, 4 Drawing Sheets

ROCK COLLECTING IMPLEMENT

BACKGROUND OF THE INVENTION

The present invention relates generally to implements used in the collecting of rocks and other debris from the ground surface. More particularly, the present invention provides a selectable positive stop for a rock collecting implement to inhibit upward movement of the collecting device from the ground. Generally, machines of this type till and/or loosen the soil on the ground, level the ground, rake up rocks and debris from the ground, and collect the rocks and debris for later removal. Typically, implements of this type either windrow the rocks and debris into a row along the windrower for later collection or gather the rocks and debris in front of the collection device in order to make a pile.

Various rock windrower assemblies have been previously advanced. Generally, the windrower includes a chassis, a hitch on the front end thereof to connect the windrower assembly to another vehicle of self-sufficient mobility, wheels for supporting the chassis, tines for loosening of the soil, a roller typically with teeth for windrowing of rocks and debris, and support and drive means for the roller where the supports attach to the chassis and the drive means typically consist of gears and a drive chain which connect with a drive shaft from the towing vehicle.

Various improvements have been made on the rock collecting implements or rock windrower assemblies including the diagonal movement of rocks toward the side where a rock burying attachment buries them as shown in the U.S. Pat. No. 5,070,946 to Herr et al., and spiraling teeth on the roller and a folding element for a transportable rock windrower assembly as shown in the U.S. Pat. No. 4,555,897 to Degehnan.

The addition of an auxiliary roller positioned above the main roller for prevention of spilling over the main roller by rocks and debris is shown in U.S. Pat. No. 4,315,546 to Fahrenholz. The Fahrenholz invention allows the user to form larger windrows but does not prohibit dirt and smaller, selected rocks or debris, to pass between the rollers. The auxiliary roller is further pivotally mounted such that it may move away from the main roller.

Canadian patent 1,048,791 to Degelman improves the windrower assembly by allowing the main roller to "float" or rise relatively freely when relatively large, heavy, immobile objects or surface irregularities on the ground are encountered. The floating of the windrower allows the roller to rise and fall with the lay of the land.

SUMMARY OF THE INVENTION

The invention is an improvement of an implement for collecting rocks and debris off of the ground. The field implement for gathering rocks and debris on the ground has a frame for supporting movement over the ground. A support frame is pivotally connected to the frame, where on the support frame is a ground engaging roller rotationally mounted to gather debris from the ground, and a deflecting roller rotating above the ground engaging roller for deflecting debris. The field implement also includes an actuator pivotally joined to the support frame about its lower end and pivotally joined to a lever about its upper end. The lever is also connected to a different portion of the frame such that pivotal movement is allowed by the combined actuator lever pivot such that the ground engaging roller and the deflecting roller adjust relative to the ground. A positive stop for limiting pivotal motion of the lever is attached to the frame.

DETAILED DESCRIPTION OF THE PREFERRED EMBODIMENTS

Figure 1:
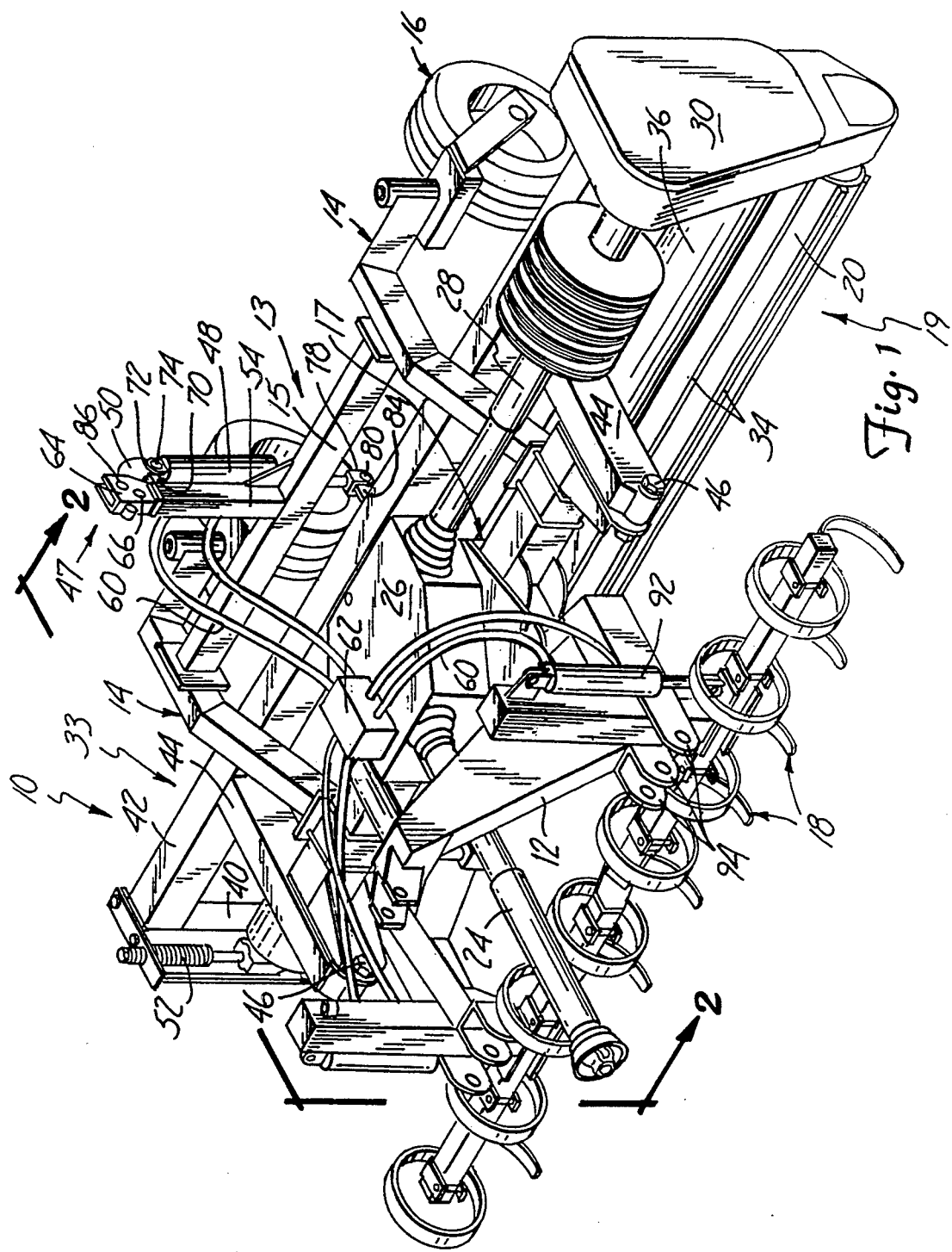
FIG. 1 is a perspective view of the field implement of the present invention.

FIG. 1 illustrates a field implement for gathering rocks and other debris from a field. Embodied as a windrower 10, the field implement has a frame 12 having a pivoting wheel support frame 13 comprising a cross frame 15 and set of wheel support legs 14, each leg allowing for movement on a ground-engaging wheel 16. The frame 12 in more detail comprises numerous supports which are necessary for the stability and the support of the windrower assembly 10. Also attached to the frame 12, on a front portion thereof, is a plurality of vertically adjustable tines 18 for penetrating and dislodging the soil such that rocks and debris may be partially dislocated therefrom. One skilled in the art will readily realize that the tines are conventional and well known in the art and it is not believed necessary to describe them in further detail.

The frame 12 which supports the windrower assembly 10, will be pulled or towed by a vehicle, not shown, across a field. The plurality of vertically adjustable tines 18 precede a gathering device 19 comprising ground-engaging windrower roller 20 which is attached to the frame 12 and rotated by gears to collect objectionable rocks and debris.

Figure 4:
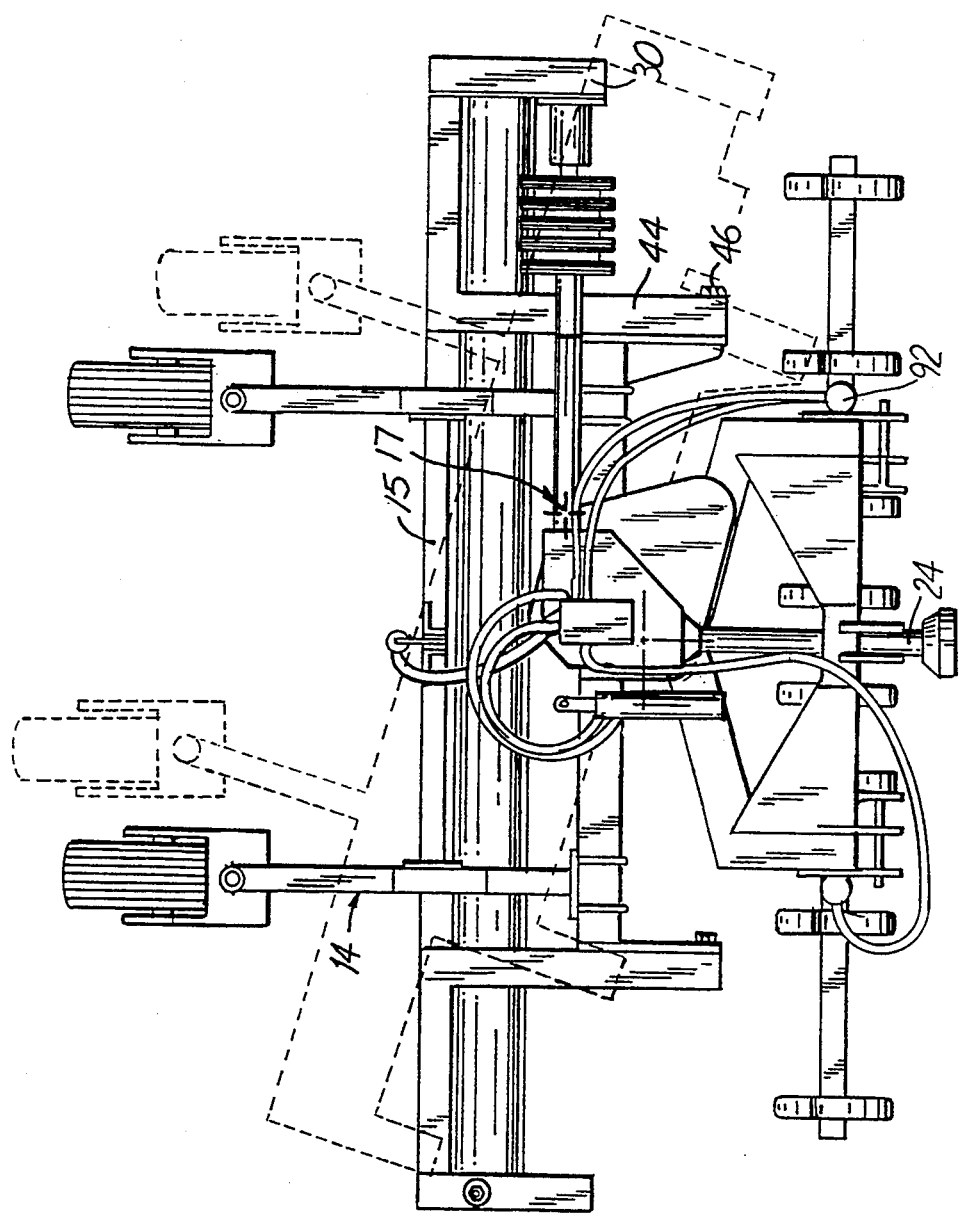
FIG. 4 is a top plan view of the field implement wherein dashed lines illustrate the implement in an angled position.

The windrower roller 20 operates at a selected angle, which may be perpendicular, with reference to the direction the windrower assembly 10 is being towed. The perpendicular position, as shown in FIG. 4, of the windrower roller 20 results in the objectionable rocks and debris being accumulated in front of the windrower roller 20. The diagonal position, as shown with the dashed lines in FIG. 4, of the windrower roller 20 results in the objectionable rocks and debris being shuffled along the windrower roller 20 until a rearmost end of the windrower roller 20 is reached where a row of rocks and debris is formed.

A drive shaft attachment 24, a gear box 26, a gear box output shaft 28 having a clutch thereattached and at least one roller attachment and drive device 30, connect to and rotate the windrower roller 20. The windrower roller 20 rotates such that rocks and debris are carried forward and upward, typically by bars 34 or other similar longitudinal splines on the windrower roller 20, toward a deflecting device, herein shown as a roller 36. The deflector roller 36 is positioned in a manner such that its rotational axis runs parallel to the windrower roller 20. The deflector roller 36, which typically rotates in the same rotational direction as the windrower roller 20, deflects objectionable rocks and debris forward also. Rocks and debris are objectionable if larger than a gap 38, as shown in FIG. 2, between the windrower roller 20 and the deflector roller 36.

The windrower roller 20 and the deflector roller 36 are pivotally attached to the frame 12 by a support frame 33. The support frame 33 comprises two end supports 40 connected by a cross support 42 which connects to the frame 12 via two attachment arms 44, and the wheel support frame 13. The two attachment arms 44 pivot about external frame pins 46. The support frame 33 is rotatable about a fixed pivotal point generally indicated at 17 on the frame 12 thus allowing angular adjustment of the windrower roller 20 and the deflector roller 36.

Figure 2:
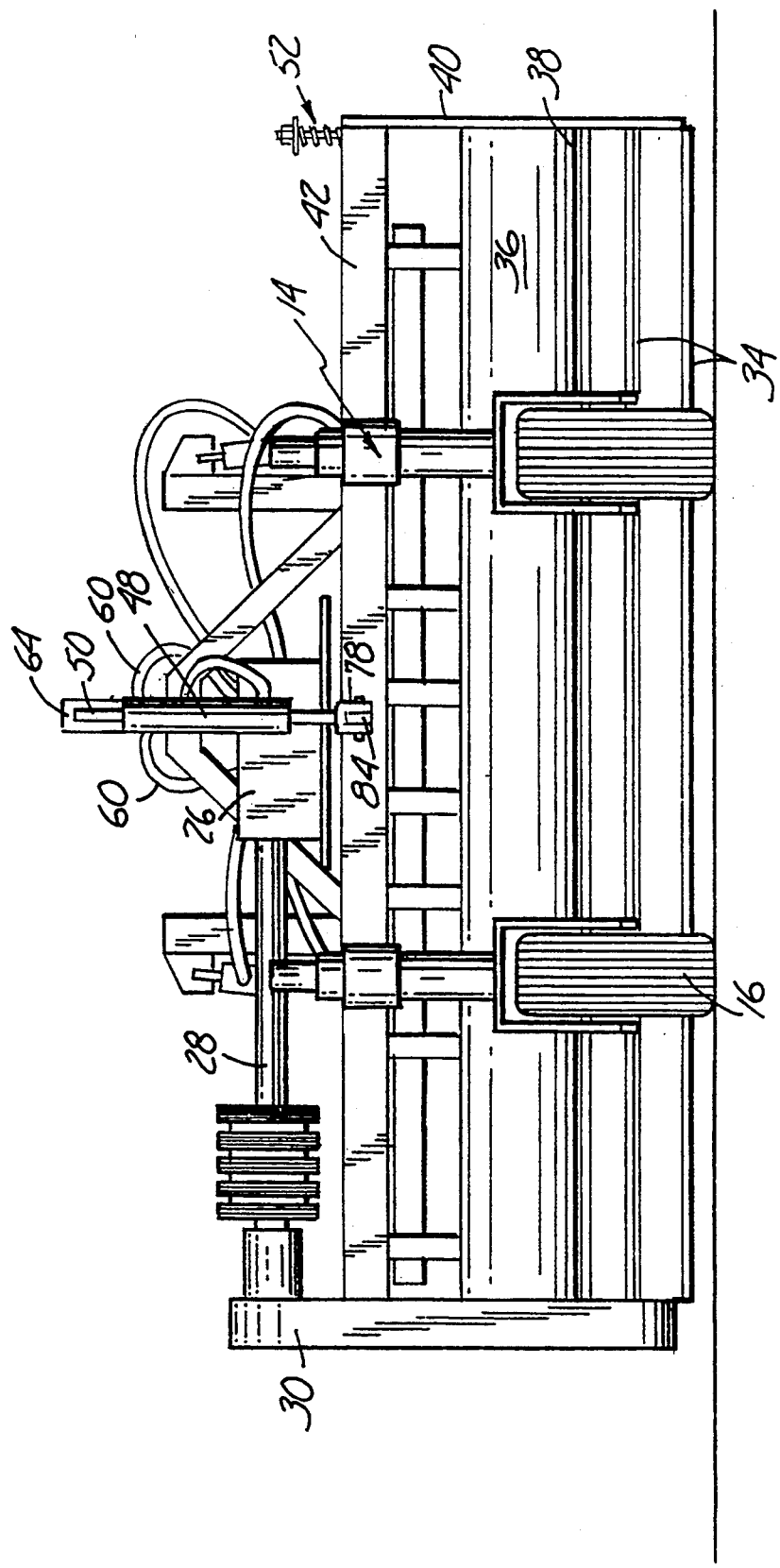
FIG. 2 is a rear view of the field implement.
Figure 3:
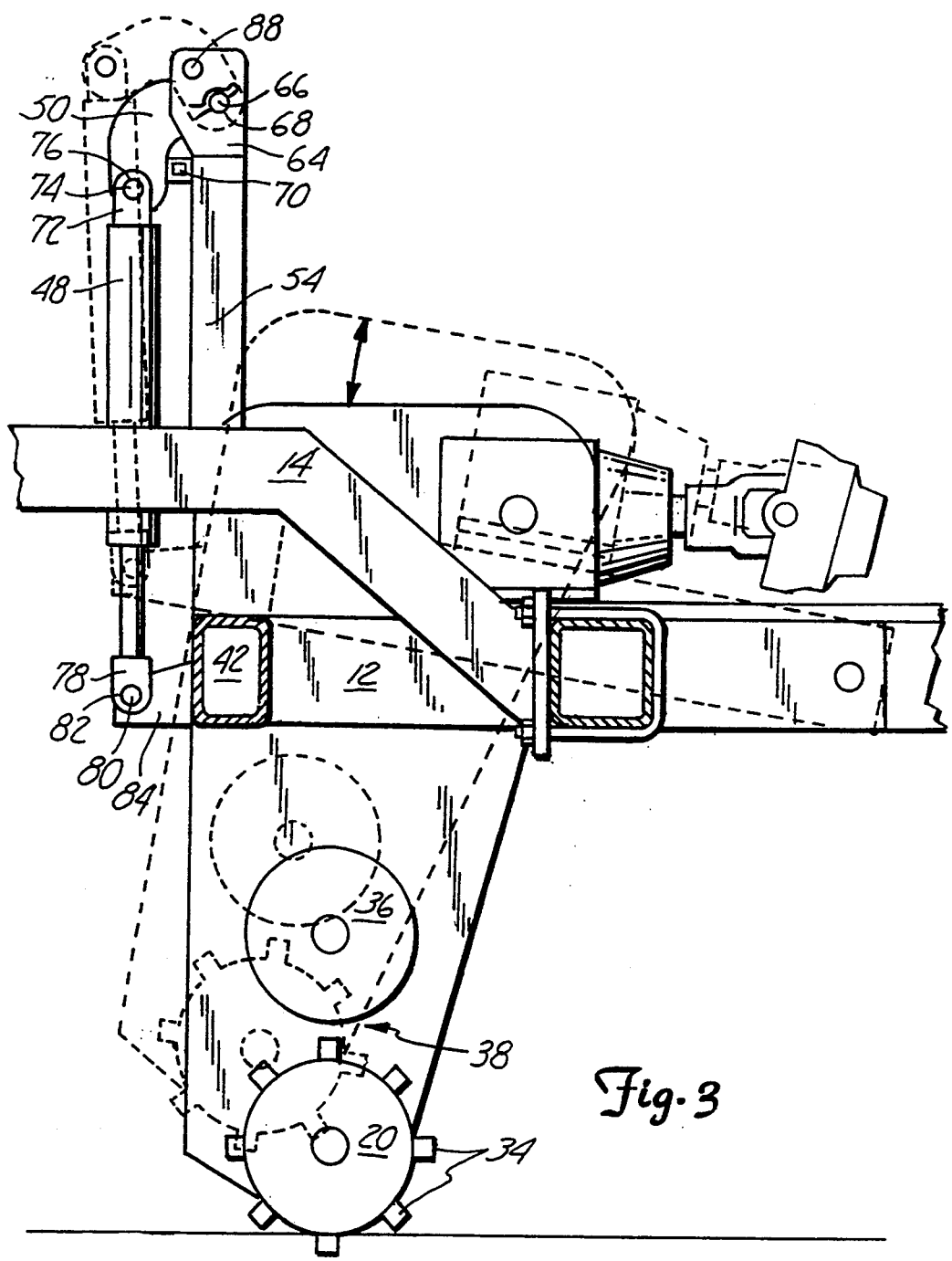
FIG. 3 is a section view of the field implement taken along line 3—3 in FIG. 1.

As stated, the deflector roller 36 is positioned at a selected distance from the windrower roller 20 forming the gap 38, as shown in FIGS. 2 and 3, such that selected rocks and debris proceed through the gap 38, while objectionable rocks and debris are deflected forwardly. Each end support 40 includes an adjustable deflector spring 52, which in turn connects to the deflector roller 36. The deflected rocks and debris are trapped in from of the windrower roller 20 and the deflector roller 36 whereby they accumulate in from of the windrower roller 20. In the alternative when the windrower roller 20 is positioned diagonally, the deflected rocks and debris are moved in from of the windrower roller 20 and the deflector roller 36 whereby they are windrowed toward a rearmost end of the windrower roller 20 where a row of rocks and debris is formed.

The windrower roller 20 operates by engaging the soil. It is desirable to be able to vertically adjust the support apparatus so that the windrower roller 20 can be properly positioned to ride at or about the soil level and so that the windrower roller 20 can be raised for transport. It is also desirable for the windrower roller to vertically float with the lay of the land especially when immoveable objects or surface irregularities are encountered.

The floating, as shown in FIG. 3, is achieved by the use of an adjusting mechanism 47 comprising hydraulic cylinder 48 which is pivotally attached to the cross support 42 on the support apparatus and to the frame assembly through a lever 50.

Referring to FIG. 3, lever 50 is pivotally attached to an extension arm 54 which extends off of the cross frame 15. The extension arm 54 is part of the frame 13 and is generally parallel to that of the hydraulic cylinder 48. The cross frame 15 is mounted between the wheel support legs 14 and thus to the frame 12.

The hydraulic cylinder 48, which is operated by a hydraulic system including hydraulic hoses 60 and valve 62 allows adjustment of the distance between the support frame 33 and the ground. This adjustment results in rotation of the support frame 33 as well as the windrower roller 20 and the deflector roller 36 about the external frame pins 46.

Generally, the frame 12 and adjusting mechanism 47 support the support frame 33 about four pivot points. Specifically, the lever 50 is pivotally attached to the extension arm 54; the hydraulic cylinder 48 is pivotally attached to the lever 50 and the cross support 42, which is fixedly attached to the windrower roller 20 while pivotally attached to the frame 12 at least once at pins 46. This support system allows the windrower roller 20 to vertically float when immovable objects or surface irregularities are encountered. The support system, however, is constricted due to the weight of the windrower roller 20, the deflector roller 36, and the support frame 33 so that the windrower roller 20 will continue to engage soil and thus collect rocks except where an object is encountered which is substantial enough to offset the above mentioned weight.

Referring to FIGS. 1 and 3, the lever 50 slides between the two spaced-apart plates of a first connector 64 mounted to the top of the extension arm 54. A pin 66 engages corresponding apertures 68 that are aligned through each of the plates in the first connector 64 and the lever 50 to allow rotation thereof. The lever 50 rests on a spacer block 70 located on the extension arm 54. The block spacer 70 prohibits downward pivotal movement by the lever 50.

A second connector 72 is attached to an uppermost end of the hydraulic cylinder 48. The lever 50 is connected to the hydraulic cylinder 48 with a pin 74 positioned in corresponding apertures 76 of the second connector 72 and the lever 50. A third connector 78 is attached to a lowermost end of the hydraulic cylinder 48 by a pin 80 which engages corresponding apertures 82 that are aligned through each of the forks in the third connector 78 and a flange 84 joined to cross support 42.

In certain situations, it may be desirable to limit some pivotal movement of the support system so that upward pivotal motion of the windrower roller 20 is prohibited. A positive stop is situated so that the lever 50 cannot rotate upward accomplishes this result. The positive stop includes a stop pin 86 fitted into a set of two aligned stop apertures 88 in the rotational path of the lever 50 and thereby limits upward movement of the windrower roller 20 and deflector roller 36. The stop apertures 88 are aligned through the first connector 64 such that when the stop pin 86 is inserted into the stop apertures 88, the lever 50 contacts it during rotation.

In other situations, it may be desirable to allow upward pivotal motion by the lever 50 within a certain range beyond which pivotal motion should be blocked. An alternative positioning of the positive stop so that the lever 50 can rotate within a range will accomplish this result. The two aligned stop apertures 88 are positioned such that some upward rotation is permitted before the upper side of the lever 50 is tangential to the stop pin 86 when the stop pin is inserted.

In a further preferred embodiment, the plurality of vertically adjustable tines 18 which penetrate and dislodge the soil are vertically adjustable based upon a line hydraulic mechanism 92 which connects the plurality of tines to the frame 12. The tine hydraulic mechanism 92 is attached through hydraulic hoses 60 to a hydraulic valve 62. A control valve (not shown) mounted on the tractor controls the amount of hydraulic pressure in the hoses and hydraulic mechanism such that the plurality of tines can be raised or lowered based upon the amount of pressure in the mechanism. The tine hydraulic mechanism 92 which connects the plurality of tines 18 to the frame 12 is adjustable independently of the adjustment of the height of the ground engaging windrower roller 20.

The present invention provides an improved field implement used to gather rocks and other debris from a field. Embodied on a windrower having rollers for gathering rocks, the present invention allows the windrower to float with the lay of the land, or selectively limit all or some upward pivotal motion to increase engagement with the ground.

Although the present invention has been described with reference to preferred embodiments, workers skilled in the art will recognize that changes may be made in form and detail without departing from the spirit and scope of the invention.

What is claimed is:

1. A field implement for gathering debris on the ground, the field implement comprising:
   a frame supported for movement over the ground;
   gathering means for gathering debris at a selected angle relative to movement over the ground, the gathering means including a support frame pivotally connected to the frame; and
   adjusting means for adjusting the gathering means relative to the ground, the adjusting means comprising:
      an actuator pivotally joined at a first end to the support frame;
      a lever pivotally joined to a second end of the actuator and pivotally joined to the frame, the lever having a maximum range of pivotal motion; and
      a positive stop for selectively limiting pivotal motion of the lever to a range of pivotal motion less than the maximum range of pivotal motion.

2. The field implement of claim 1 wherein the frame includes an aperture located in the rotational path of the lever, and the positive stop comprises a pin placed ill the aperture to limit pivotal rotation of the lever.

3. The field implement of claim 2 wherein the gathering means further comprises:
   a ground-engaging roller rotationally mounted to the support frame, the ground-engaging roller rotating to gather debris from the ground; and
   deflecting means connected to the support frame above the ground-engaging roller for deflecting debris.

4. The field implement of claim 3 wherein the deflecting means comprises a deflecting roller rotating about an axis generally parallel to the ground-engaging roller.

5. The windrower assembly as specified in claim 4 wherein the deflecting roller rotates in the same rotational direction as the ground-engaging roller.

6. A field implement for gathering debris on the ground, the field implement comprising:
   a frame supported for movement over the ground;
   a support frame connected to the frame for movement relative to the frame;
   a ground-engaging roller rotatably connected to the support frame;
   an actuator joined at a first end to the support frame;
   a lever pivotally joined to a second end of the actuator and pivotally joined to the frame, the lever having a maximum range of pivotal motion over a rotational path;
   a positive stop selectively positionable in the rotational path to limit pivotal motion of the lever to a range of pivotal motion less than the maximum range of pivotal motion.

7. The field implement of claim 6 wherein the frame includes an aperture located in the rotational path of the lever, and the positive stop comprises a pin placed in the aperture to limit pivotal rotation of the lever.

8. The field implement of claim 6 and further comprising a deflecting roller rotating about an axis generally parallel to the ground-engaging roller.

9. The field implement of claim 8 wherein the deflecting roller rotates in the same rotational direction as the ground-engaging roller.

10. The field implement of claim 6 wherein the frame includes a wheel support frame extending over the ground-engaging roller, and a pair of wheels pivotally connected to the wheel support frame, the wheels contacting the ground to support the implement.

11. The field implement of claim 10 wherein the lever is pivotally connected to the wheel support frame.

12. The field implement of claim 11 wherein the wheel support frame comprises a support arm for each wheel and a cross support joined at opposite ends to each support arm, the lever being pivotally connected to the cross support.

13. A field implement for gathering debris on the ground, the field implement comprising:
   a frame supported for movement over the ground;
   a support frame connected to the frame with a pivot connection for pivotal movement relative to the frame;
   a ground-engaging roller rotatably connected to the support frame;
   an actuator having a cylinder with an extendable rod therein joined to the support frame between the pivot connection and the ground engaging-roller, wherein extension of the extendable rod out of the cylinder engages the ground-engaging roller with the ground and retraction of the extendable rod within the cylinder lifts the ground-engaging roller away from the ground;
   a lever pivotally joined to the cylinder and pivotally joined to the frame;
   a pin selectively locatable in an aperture of the frame to limit pivotal motion of the lever when the pin is located in the aperture.

* * * * *

UNITED STATES PATENT AND TRADEMARK OFFICE
CERTIFICATE OF CORRECTION

PATENT NO. : 5,450,907
DATED : September 19, 1995
INVENTOR(S) : Mac E. McPherson et al.

It is certified that error appears in the above-indentified patent and that said Letters Patent is hereby corrected as shown below:

Column 5, line 26, replace "ill" with --in--.

Signed and Sealed this

Sixteenth Day of April, 1996

BRUCE LEHMAN

*Attest:*

*Attesting Officer*     Commissioner of Patents and Trademarks